April 17, 1928.
C. MARCH
FLYCATCHER
Filed April 9, 1927
1,666,785
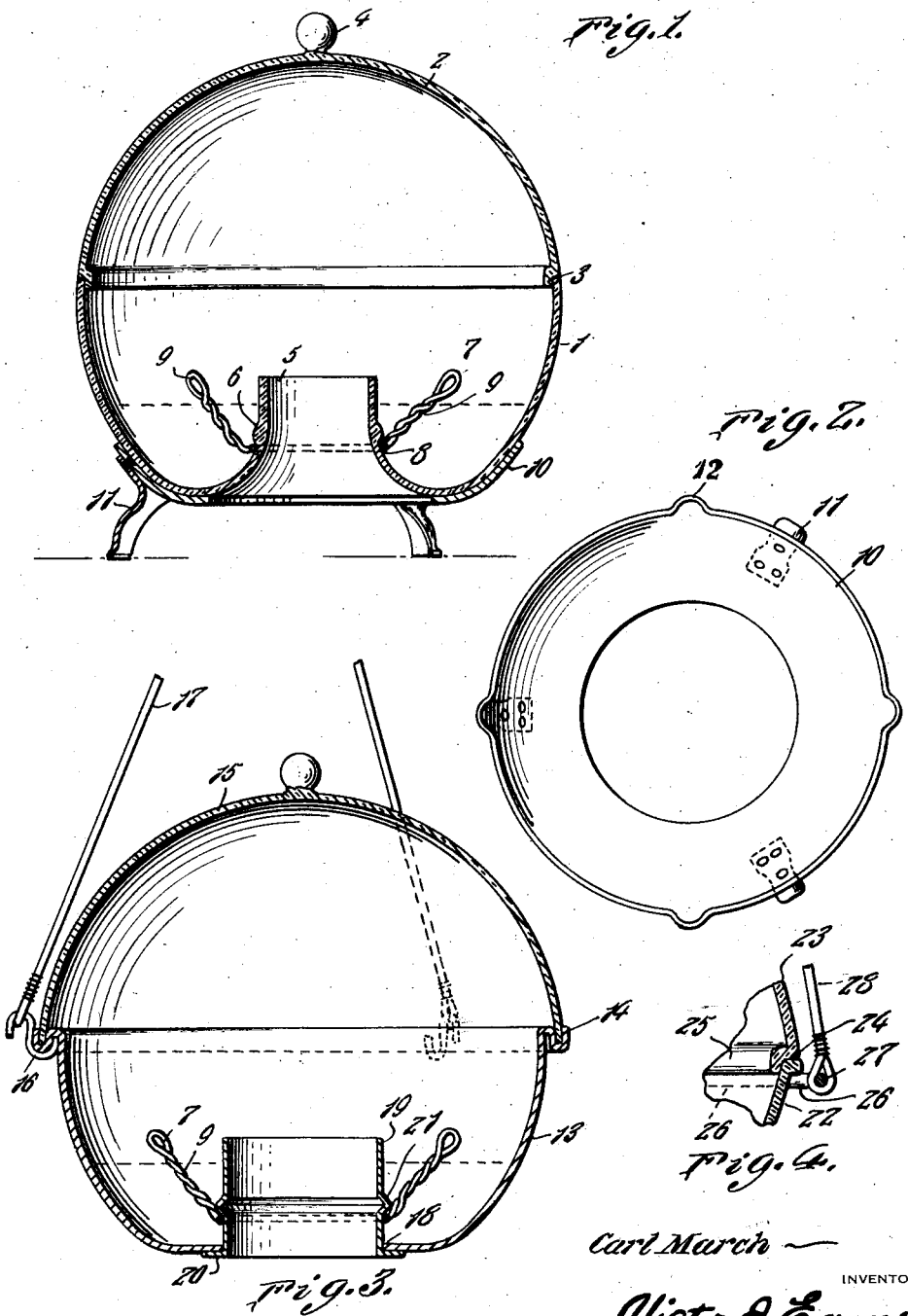
Carl March
INVENTOR
BY Victor J. Evans
ATTORNEY Patented Apr. 17, 1928.

1,666,785

UNITED STATES PATENT OFFICE.

CARL MARCH, OF CHICAGO, ILLINOIS.

FLYCATCHER.

Application filed April 9, 1927. Serial No. 182,457.

This invention relates to fly traps, and is an improvement on my Patent No. 1,591,854, dated July 6th, 1926.

The general object of the present invention is to provide a fly trap that will perform all of the functions and has all of the advantages of the trap disclosed in my patent above mentioned, with added functions and advantages, namely the trap forming the subject matter of the present invention can be manufactured in an expeditious manner for a small cost, can be kept in a clean and sanitary condition with very little effort and is capable of being supported on a flat surface or in a depending position from a ceiling or the like.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:

Figure 1 is a vertical sectional view taken through one form of the trap of the present invention.

Figure 2 is a top plan view of the base for the form as shown in Figure 1.

Figure 3 is a vertical sectional view taken through a modified form.

Figure 4 is a fragmentary view illustrating another modified form.

Referring to the drawings in detail and particularly to Figures 1 and 2, the body of the trap as shown in Figure 1 is indicated by the reference numeral 1 and its top by the numeral 2. The body and its top is formed from glass in this form of the invention and the top is formed on its lower edge with a downturned inwardly extending bead 3 which is adapted to support the top upon the upper edge of the body as shown. The top is provided with a suitable knob 4 by means of which it may be readily lifted from its operative position or replaced, as will be readily apparent.

The body 1 has formed with its bottom a centrally disposed upwardly curved flange 5 which terminates approximately centrally of the body and is formed with an annular boss 6 for the purpose of retaining the bait holder 7 in operative position. The bait holder is formed from a ring 8 surrounding the flange 6 and has extending upwardly therefrom at diametrically opposite sides bait receiving wires 9.

This form of the invention is provided with a base which includes a receiving portion 10 for the body 1 and which is curved upwardly to follow the curvature of the sides of the body. The portion 10 is formed with a centrally disposed opening so as to allow ingress of the insects to the trap through the flange thereof and the base is formed with depending legs 11 having their upper ends riveted or otherwise secured to the receiving portion as shown. The receiving portion of the base has its upper edge formed with outwardly extending ears 12 so as to add to the appearance of the construction.

In the form of the invention as disclosed in Figure 3, the body 13 is formed from metal and its upper edge is curved downwardly upon itself and thence upwardly to provide a channel 14 for the purpose of accommodating the top 15 as shown. This channel portion is arranged in spaced relation with respect to the body proper so as to provide a sufficient space to accommodate one of the ends of hook members 16, while the opposite end of these hook members is adapted to receive the lower ends of flexible elements 17 so that this form of the trap can be supported in depending position from a ceiling or the like.

The body 13 in this form is provided with a centrally disposed opening 18 in its bottom to receive a tubular member 19 which is flanged as at 20 to limit the upward movement of said member in its opening. The tubular member is provided with a bead 21 to retain the bait holder of this form in operative position.

In Figure 4 I have disclosed another modified form and in this form the body 22 and top 23 are both formed from glass and have each of their confronting and meeting edges provided with a bead indicated respectively by the reference numerals 24 and 25 so that the top will be substantially retained upon the body through the medium of the bead 25 and the bead 24 provides a stop for a ring 26 which has formed at intervals in its length outwardly extending loops 27 to securely receive the lower ends of flexible elements 28.

From the above description and disclosure in the drawings, it will be obvious that the present invention and its forms present a decided improvement over my patent mentioned above and while the trapping qualities of the present invention are somewhat the same as the disclosure in my patent, it will be apparent that by forming the trap into separate parts, as shown, with some of the parts made from metal that the cost of manufacturing the same has been reduced to a minimum, and the trap of the present invention cannot only be supported upon a flat surface but can be arranged in a depending position from a ceiling or the like through the instrumentality of the flexible elements and securing means therefor as shown in Figures 3 and 4 of the drawings.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:

1. An insect trap of the character described comprising a body, a channel portion formed with the upper edge thereof and being disposed in spaced relation from the body proper, a top for said body and being received in the channel of the channel portion, hooked members received in the space between the channel portion and body insect entrance means arranged in the bottom of said body and flexible elements secured to the hook members for supporting the trap in depending position.

2. An insect trap of the character described comprising a body, a channel portion formed with the upper edge thereof and being disposed in spaced relation with the body proper, a top for said body and being received in the channel of the channel portion, supporting means for said body, a tubular member arranged through an opening formed in the bottom of said body, a flange formed with said tubular member and being engageable with the bottom to limit the upward movement of said tubular member, a V-shaped annular bead formed with and about said tubular member and a bait holder surrounding the tubular member and retained thereon by said bead.

In testimony whereof I affix my signature.

CARL MARCH.